United States Patent
Atsumi

(10) Patent No.: US 11,231,772 B2
(45) Date of Patent: Jan. 25, 2022

(54) APPARATUS CONTROL DEVICE, METHOD OF CONTROLLING APPARATUS, AND NON-TRANSITORY RECORDING MEDIUM

(71) Applicant: CASIO COMPUTER CO., LTD., Tokyo (JP)

(72) Inventor: Hiroki Atsumi, Tachikawa (JP)

(73) Assignee: CASIO COMPUTER CO., LTD., Tokyo (JP)

(*) Notice: Subject to any disclaimer, the term of this patent is extended or adjusted under 35 U.S.C. 154(b) by 0 days.

(21) Appl. No.: 17/082,127

(22) Filed: Oct. 28, 2020

(65) Prior Publication Data

US 2021/0132685 A1    May 6, 2021

(30) Foreign Application Priority Data

Oct. 31, 2019    (JP) .............................. JP2019-198917

(51) Int. Cl.
G06F 3/01    (2006.01)

(52) U.S. Cl.
CPC ........ G06F 3/011 (2013.01); *G06F 2203/011* (2013.01)

(58) Field of Classification Search
CPC .............. G06N 3/004; G06F 2203/011; G05B 2219/33056
See application file for complete search history.

(56) References Cited

U.S. PATENT DOCUMENTS

| 7,063,591 B2 | 6/2006 | Furumura |
| 2011/0184900 A1* | 7/2011 | Jung ........................ G06N 5/02 706/46 |

FOREIGN PATENT DOCUMENTS

| JP | 2000222378 A | 8/2000 |
| JP | 2001191281 A | 7/2001 |
| JP | 2002144259 A | 5/2002 |
| JP | 2003039362 A | 2/2003 |

OTHER PUBLICATIONS

Japanese Office Action (and English language translation thereof) dated Oct. 19, 2021 issued in counterpart Japanese Application No. 2019-198917.

* cited by examiner

*Primary Examiner* — Priyank J Shah
(74) *Attorney, Agent, or Firm* — Holtz, Holtz & Volek PC

(57) ABSTRACT

A control device includes at least one processor, and a memory configured to store a program to be executed by the processor. The processor is configured to acquire an external stimulation applied from an outside to an apparatus, learn an emotion change parameter for changing a simulated emotion of the apparatus in accordance with the acquired external stimulation, acquire the learned emotion change parameter in accordance with the acquired external stimulation, set an emotion parameter indicating the simulated emotion of the apparatus in accordance with the acquired emotion change parameter, and control a behavior of the apparatus in accordance with the set emotion parameter.

7 Claims, 8 Drawing Sheets

APPARATUS CONTROL DEVICE, METHOD OF CONTROLLING APPARATUS, AND NON-TRANSITORY RECORDING MEDIUM

CROSS-REFERENCE TO RELATED APPLICATION

This application claims the benefit of Japanese Patent Application No. 2019-198917, filed on Oct. 31, 2019, the entire disclosure of which is incorporated by reference herein.

FIELD

This application relates to an apparatus control device, a method of controlling an apparatus, and a non-transitory recording medium.

BACKGROUND

Various devices for controlling the behaviors of apparatuses (for example, robots) have been developed so as to make the apparatuses more familiar like friends and pets. For example, Unexamined Japanese Patent Application Publication No. 2000-222378 discloses a touring assist system that assists a user in designing a touring plan. This system generates a pseudo emotion and a pseudo character on the basis of the current state and characteristics of the user. The system then causes the own apparatus to execute a predetermined autonomous action pattern and emotional expression pattern on the basis of the pseudo emotion and the pseudo character. The system can thus respond to the user more naturally and more adaptively.

SUMMARY

An apparatus control device for controlling an apparatus of the present disclosure includes:
at least one processor; and
a memory configured to store a program to be executed by the processor, wherein
the processor is configured to
acquire at least one external stimulation applied from an outside to the apparatus,
learn at least one emotion change parameter for changing a simulated emotion of the apparatus in accordance with the acquired external stimulation,
acquire the learned emotion change parameter in accordance with the acquired external stimulation,
set at least one emotion parameter indicating the simulated emotion of the apparatus in accordance with the acquired emotion change parameter, and
control a behavior of the apparatus in accordance with the set emotion parameter.

BRIEF DESCRIPTION OF THE DRAWINGS

A more complete understanding of this application can be obtained when the following detailed description is considered in conjunction with the following drawings, in which.

DETAILED DESCRIPTION

An embodiment of the disclosure will now be described with reference to the accompanying drawings. The components identical or corresponding to each other are provided with the same reference symbol.

Embodiment

Figure 1:
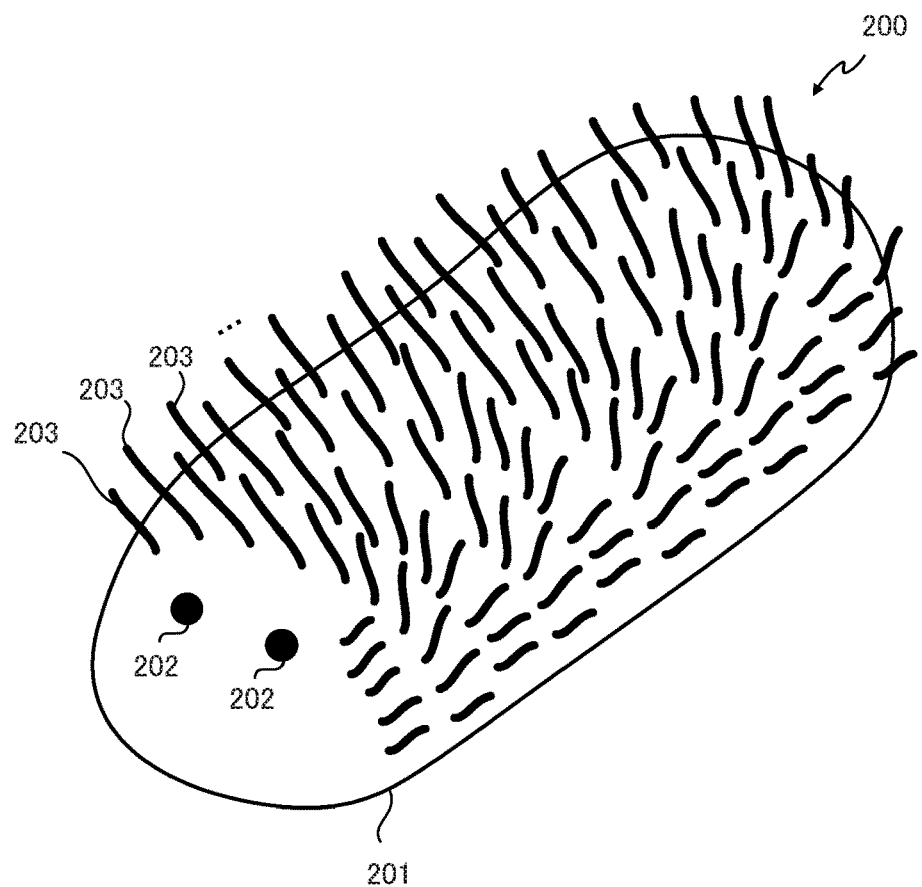
FIG. 1 illustrates the appearance of a robot according to an embodiment.
Figure 2:
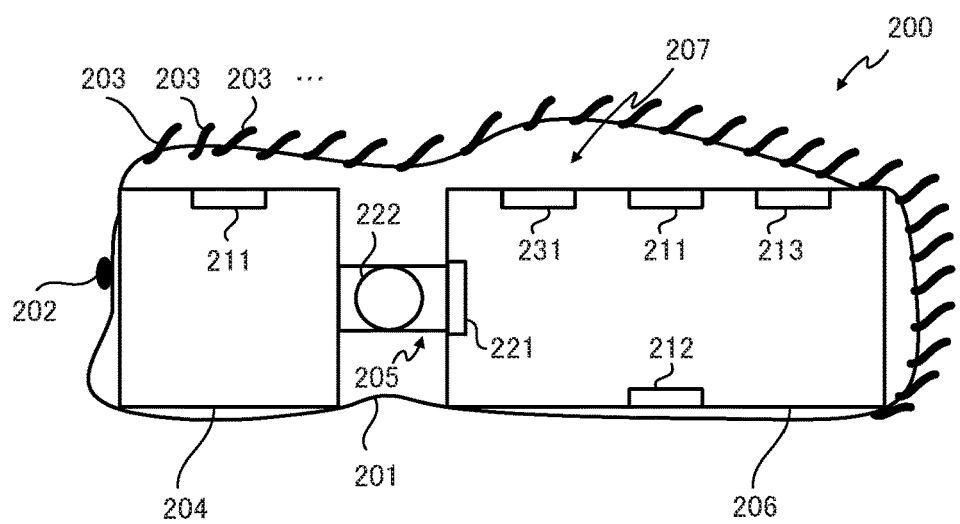
FIG. 2 is a sectional view of the robot according to the embodiment as viewed from the side.

An embodiment in which an apparatus control device according to the disclosure is applied to a robot 200 illustrated in FIG. 1 will now be described with reference to the accompanying drawings. The robot 200 according to the embodiment is a pet robot in the similitude of a small animal. As illustrated in FIG. 1, the robot 200 is covered with an outer cover 201 having decorative parts 202 in the similitude of eyes and abundant hairs 203. The outer cover 201 accommodates a housing 207 of the robot 200. With reference to FIG. 2, the housing 207 of the robot 200 includes a head 204, a joint 205, and a body 206. The head 204 is coupled to the body 206 via the joint 205.

The outer cover 201 is mounted over the housing 207 with snap fasteners so that the outer cover 201 moves in accordance with a movement of the housing 207 of the robot 200. Specifically, the head 204 has two snap fasteners in the front portion and the body 206 has two snap fasteners in the rear portion. The outer cover 201 also has snap fasteners at the corresponding positions to fit with the snap fasteners of the head 204 and the body 206. These snap fasteners fix the outer cover 201 over the housing 207. The illustrated number and positions of the snap fasteners are a mere example and may be arbitrarily modified.

The body 206 extends in the front-rear direction and is in contact via the outer cover 201 with a placement surface (for example, floor or table) on which the robot 200 is placed. As illustrated in FIG. 2, the body 206 is equipped with a roll motor 221 at the front end. The front end of the body 206 is coupled to the head 204 via the joint 205. The joint 205 is equipped with a pitch motor 222. The roll motor 221 is included in the body 206 in FIG. 2 but may alternatively be included in the joint 205.

Figure 3:
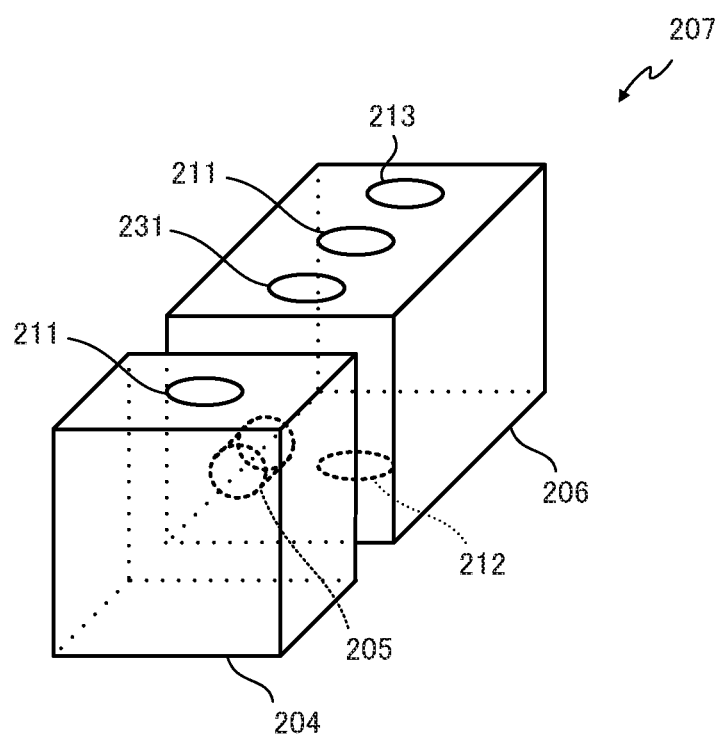
FIG. 3 is a diagram for describing a housing of the robot according to the embodiment.
Figure 4:
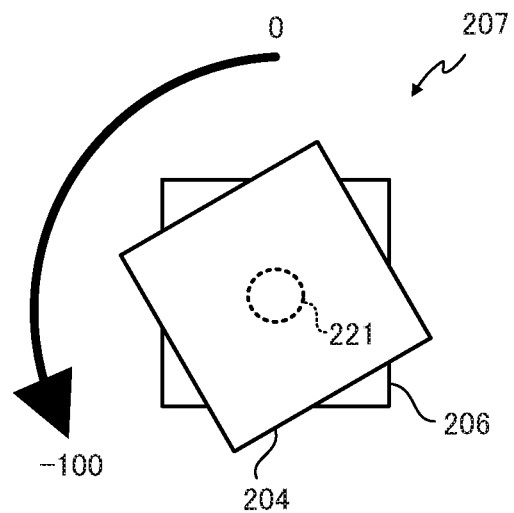
FIG. 4 is a diagram for explaining an exemplary movement of a roll motor of the robot according to the embodiment.
Figure 5:
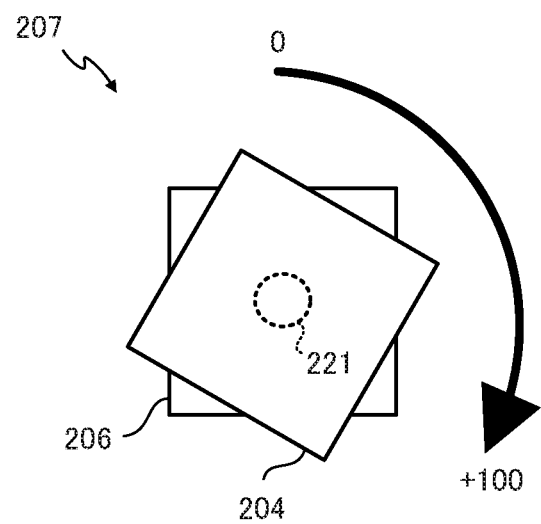
FIG. 5 is another diagram for explaining an exemplary movement of the roll motor of the robot according to the embodiment.

The joint 205 couples the body 206 to the head 204 so as to be rotatable about a first rotational axis, which extends through the joint 205 in the front-rear direction of the body 206. With reference to the front view of the housing 207 in FIG. 4 or 5, the roll motor 221 drives the head 204 to turn about the first rotational axis in a clockwise (right-hand) direction (that is, make a normal turn) relative to the body 206 within a normal-turn angle range, or turn in a counter-clockwise (left-hand) direction (that is, make a reverse turn) within a reverse-turn angle range. The clockwise direction in this description means the clockwise direction when viewed from the body 206 toward the head 204. The turn in the clockwise direction will be also referred to as "right-hand twist" and the turn in the counterclockwise direction will be also referred to as "left-hand twist". The angle of the right-hand or left-hand twist has any limit. In FIGS. 4 and 5, the angle of 0 (hereinafter referred to as "reference roll angle") of the head 204 indicates the state in which the head 204 does not twist in the right-hand or left-hand direction as illustrated in FIG. 3. The angle of −100 indicates the right limit of the right-hand twist (clockwise turn) and the angle of +100 indicates the left limit of the left-hand twist (counterclockwise turn).

Figure 6:
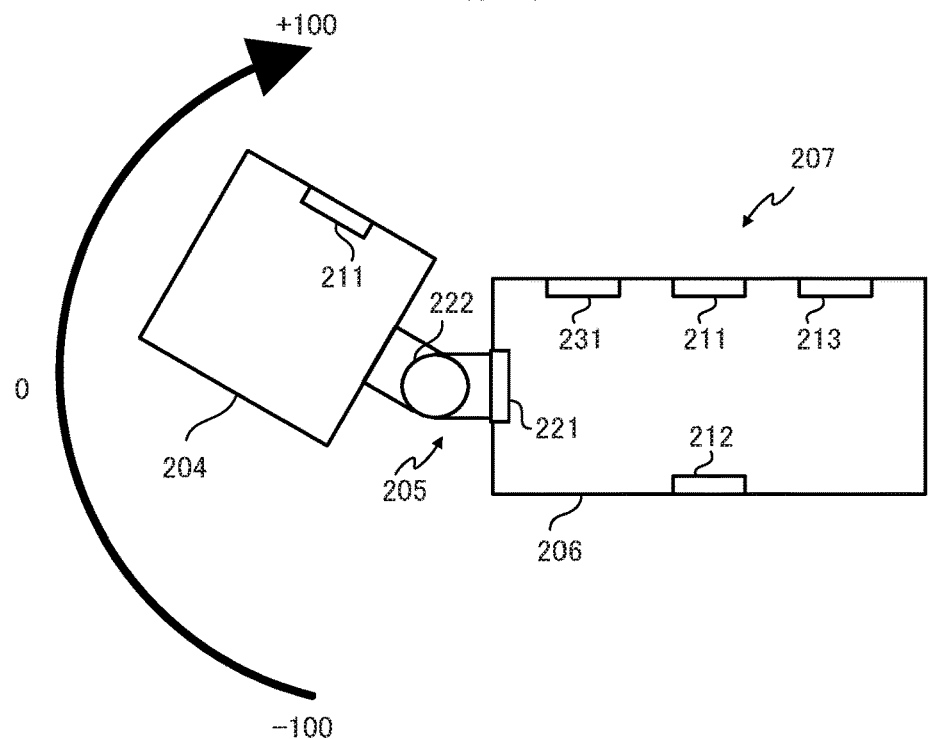
FIG. 6 is a diagram for explaining an exemplary movement of a pitch motor of the robot according to the embodiment.
Figure 7:
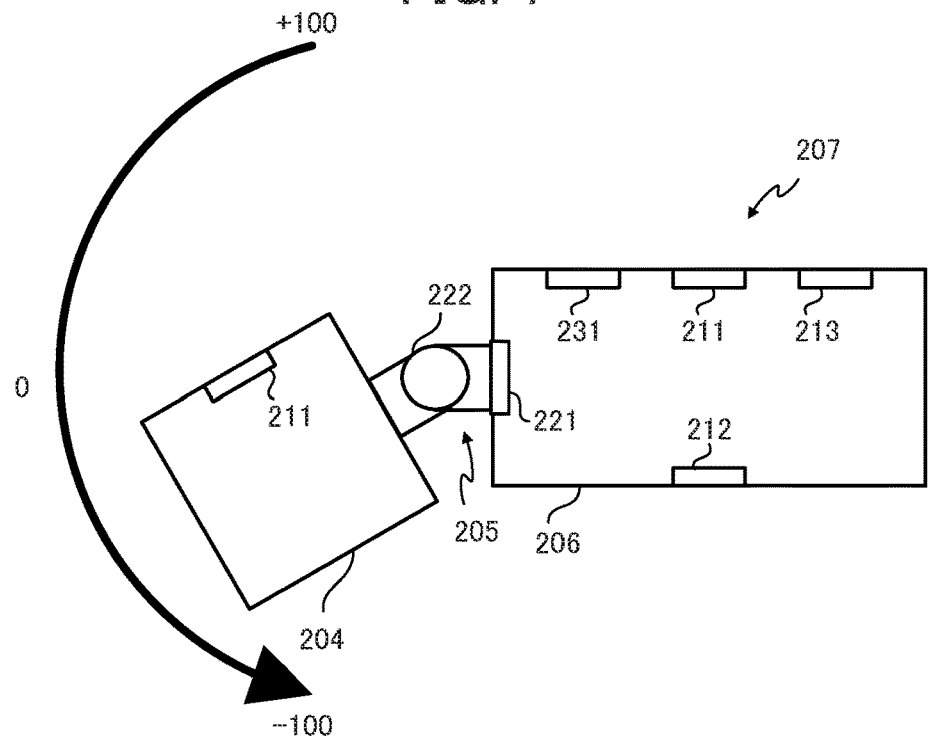
FIG. 7 is another diagram for explaining an exemplary movement of the pitch motor of the robot according to the embodiment.

The joint 205 couples the body 206 to the head 204 so as to be rotatable also about a second rotational axis, which extends through the joint 205 in the width direction of the body 206. With reference to the side view of the housing 207 in FIG. 6 or 7, the pitch motor 222 drives the head 204 to turn about the second rotational axis upward (that is, make a normal turn) within a normal-turn angle range, or turn downward (that is, make a reverse turn) within a reverse-turn angle range. The angle of the upward or downward turn has any limit. In FIGS. 6 and 7, the angle of 0 (hereinafter referred to as "reference pitch angle") of the head 204 indicates a state in which the head 204 does not turn upward or downward as illustrated in FIG. 2. The angle of −100 indicates the lower limit of the downward turn and the angle of +100 indicates the upper limit of the upward turn. If the head 204 turns upward or downward about the second rotational axis to the reference pitch angle or an angle located below the reference pitch angle, the head 204 can come into contact via the outer cover 201 with the placement surface (for example, floor or table) on which the robot 200 is placed. The first rotational axis is orthogonal to the second rotational axis in the example illustrated in FIG. 2 but does not have to be orthogonal to the second rotational axis.

As illustrated in FIG. 2, the head 204 of the robot 200 is equipped with a touch sensor 211 so as to detect that a user is patting or slapping the head 204. The body 206 is also equipped with another touch sensor 211 so as to detect that the user is patting or slapping the body 206.

The body 206 of the robot 200 is further equipped with an acceleration sensor 212 so as to detect the orientation of the robot 200 itself and detect that the user is lifting, turning, or throwing the robot 200. The body 206 of the robot 200 is further equipped with a microphone 213 so as to detect external sounds. The body 206 of the robot 200 is further equipped with a speaker 231, which is used to emit a sound of the robot 200.

Although the acceleration sensor 212, the microphone 213, and the speaker 231 are included in the body 206 according to the embodiment, some or all of these components may be included in the head 204. Alternatively, the head 204 may include some or all of the acceleration sensor, microphone, and speaker in addition to the acceleration sensor 212, the microphone 213, and the speaker 231 included in the body 206.

Figure 8:
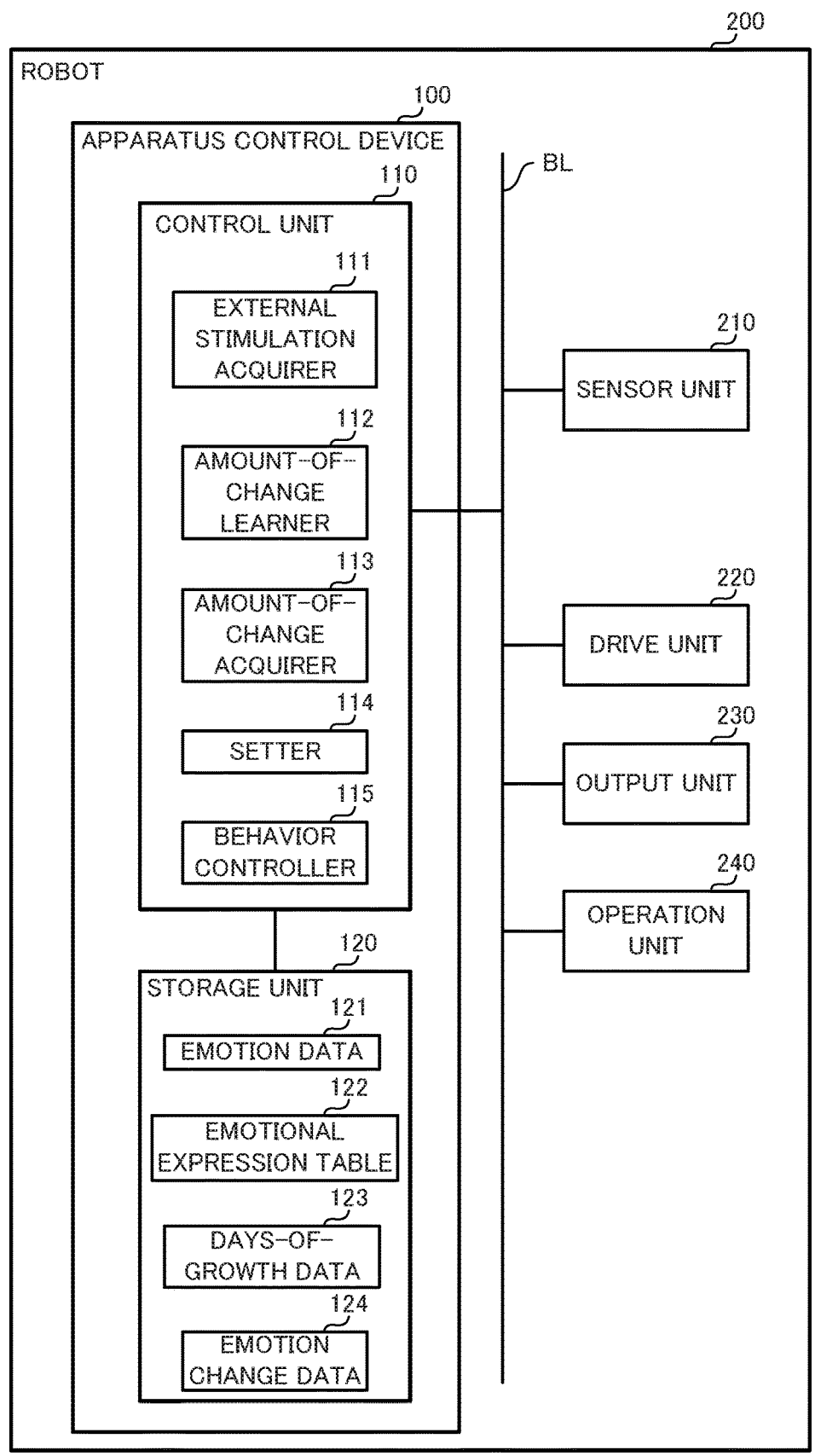
FIG. 8 is a block diagram illustrating a functional configuration of the robot according to the embodiment.

A functional configuration of the robot 200 will now be described. With reference to FIG. 8, the robot 200 has an apparatus control device 100, a sensor unit 210, a drive unit 220, an output unit 230, and an operation unit 240. The apparatus control device 100 includes a control unit 110 and a storage unit 120. Although the apparatus control device 100, the sensor unit 210, the drive unit 220, the output unit 230, and the operation unit 240 are connected to each other via bus lines BL in FIG. 8, this configuration is a mere example. The apparatus control device 100, the sensor unit 210, the drive unit 220, the output unit 230, and the operation unit 240 may also be connected to each other via a wired interface, such as a universal serial bus (USB) cable, or a wireless interface, such as a Bluetooth (registered trademark) interface. The control unit 110 may be connected to the storage unit 120 via a bus line BL.

The apparatus control device 100 controls the behavior of the robot 200 using the control unit 110 and the storage unit 120.

The control unit 110 includes, for example, a central processing unit (CPU) functioning as at least one processor. The control unit 110 executes programs stored in the storage unit 120 and thereby performs functions of individual components (an external stimulation acquirer 111, an amount-of-change learner 112, an amount-of-change acquirer 113, a setter 114, and an behavior controller 115), which will be described later. The control unit 110 also has clocking and timer functions (not shown) and can determine the date and time, for example.

The storage unit 120 includes, for example, a read-only memory (ROM), a flash memory, and a random access memory (RAM). The ROM preliminarily stores the programs to be executed by the CPU of the control unit 110 and data necessary for execution of the programs. The flash memory is a writable non-volatile memory and stores data that should be maintained even after power-off. The RAM stores data generated or modified during the execution of the programs.

The sensor unit 210 includes the above-mentioned touch sensors 211, acceleration sensor 212, and microphone 213. The control unit 110 acquires the values detected by these sensors included in the sensor unit 210 through the bus lines BL in the form of external stimulations. The sensor unit 210 may include other sensors as well as the touch sensors 211, the acceleration sensor 212, and the microphone 213. As the number of types of sensors included in the sensor unit 210 increases, the number of types of external stimulations acquired by the control unit 110 also increases.

The touch sensors 211 detect contact with any object. Each of the touch sensors 211 includes, for example, a pressure sensor or an electrostatic capacitance sensor. On the basis of the detected values from the touch sensors 211, the control unit 110 detects that the user is tapping or slapping the robot 200, for example.

The acceleration sensor 212 detects accelerations in the three directions: the front-rear direction, the width (right-left) direction, and the up-down direction of the body 206 of the robot 200. The acceleration sensor 212 detects the gravitational acceleration while the robot 200 stands still. The control unit 110 can thus detect the current orientation of the robot 200 on the basis of the gravitational acceleration detected by the acceleration sensor 212. For example, if the user is lifting or throwing the robot 200, the acceleration sensor 212 detects an acceleration caused by the travel of the robot 200 in addition to the gravitational acceleration. The control unit 110 subtracts the component of gravitational acceleration from the value detected by the acceleration sensor 212 and can thereby detect the travel of the robot 200.

The microphone 213 detects sounds around the robot 200. On the basis of the sound components detected by the microphone 213, the control unit 110 can detect that the user is calling the robot 200 or clapping the hands, for example.

The drive unit 220 includes the roll motor 221 and the pitch motor 222 functioning as at least one actuator. The drive unit 220 is driven by the control unit 110. This operation enables the robot 200 to, for example, raise the head 204 (turn the head 204 upward about the second rotational axis), incline the head 204 (twist the head 204 about the first rotational axis in the right-hand or left-hand direction), or perform other behaviors. These behaviors require behavior control data, which is recorded in an emotional expression table 122 (described later). The movement of the head 204 of the robot 200 is controlled on the basis of a simulated emotion on an emotion map (described later). The behavior control data recorded in the emotional expression table 122 allows the robot 200 to behave as if the robot 200 is pleased on the basis of a pleased emotion, and behave as if the robot 200 is sad on the basis of a sad emotion, for example.

The output unit 230 includes a speaker 231. The speaker 231 outputs a sound in response to input of sound data from the control unit 110 to the output unit 230. For example, the control unit 110 inputs data on a sound of the robot 200 to the output unit 230. The robot 200 thus emits a simulated sound. The data on the sound is also recorded in the emotional expression table 122. A sound is selected based on the simulated emotion on the emotion map (described later). The sound data recorded in the emotional expression table 122 allows the robot 200 to emit a sound as if the robot 200 is pleased on the basis of a pleased emotion, and emit a sound as if the robot 200 is sad on the basis of a sad emotion, for example.

The output unit 230 may include a display (for example, liquid crystal display) or an illuminator (for example, light emitting diode (LED)) instead of or in addition to the speaker 231. The display or the illuminator may express an emotion, such as being pleased or sad, using the content output on the display or the color or brightness of the illuminator. In this case, the emotional expression table 122 is required to preliminarily store the content to be output on the display or the color or brightness of the illuminator in association with each of the simulated emotions on the emotion map.

The operation unit 240 includes, for example, operation buttons and a volume knob. The operation unit 240 is an interface for receiving operations from the user, such as power-on and -off operations and an operation of adjusting the volume of output sounds.

The functional configuration of the control unit 110 included in the apparatus control device 100 will now be described. The control unit 110 serves as the external stimulation acquirer 111, the amount-of-change learner 112, the amount-of-change acquirer 113, the setter 114, and the behavior controller 115.

The external stimulation acquirer 111 acquires external stimulations applied from the outside to the robot 200, on the basis of the detected values from the sensor unit 210. The sensors (the touch sensors 211, the acceleration sensor 212, and the microphone 213) included in the sensor unit 210 allow the external stimulation acquirer 111 to acquire a plurality of external stimulations of mutually different types.

The amount-of-change learner 112 learns and stores the emotion change parameters (emotion change data 124, described later) for changing the simulated emotion of the robot 200, in accordance with the external stimulations acquired by the external stimulation acquirer 111. Specifically, the amount-of-change learner 112 increments or decrements the emotion change data 124 in accordance with the external stimulations, in a robot controlling process (explained later).

The amount-of-change acquirer 113 acquires the emotion change parameters (emotion change data 124) learned by the amount-of-change learner 112, in accordance with the external stimulations acquired by the external stimulation acquirer 111.

The setter 114 sets emotion parameters (emotion data 121, described later) indicating the simulated emotion of the robot 200, in accordance with the emotion change parameters (emotion change data 124) acquired by the amount-of-change acquirer 113. Specifically, the setter 114 sets the emotion data 121 on the basis of the emotion change data 124.

The behavior controller 115 controls the behavior of the robot 200, in accordance with the emotion parameters (emotion data 121) set by the setter 114. Specifically, the behavior controller 115 drives the drive unit 220 and causes the output unit 230 to emit a sound, on the basis of the data (behavior control data and sound data) in the emotional expression table 122 associated with the set emotion data 121.

The emotion data 121, the emotional expression table 122, days-of-growth data 123, and the emotion change data 124 will now be described in sequence, which are part of the data stored in the storage unit 120 and characterize the embodiment.

Figure 9:
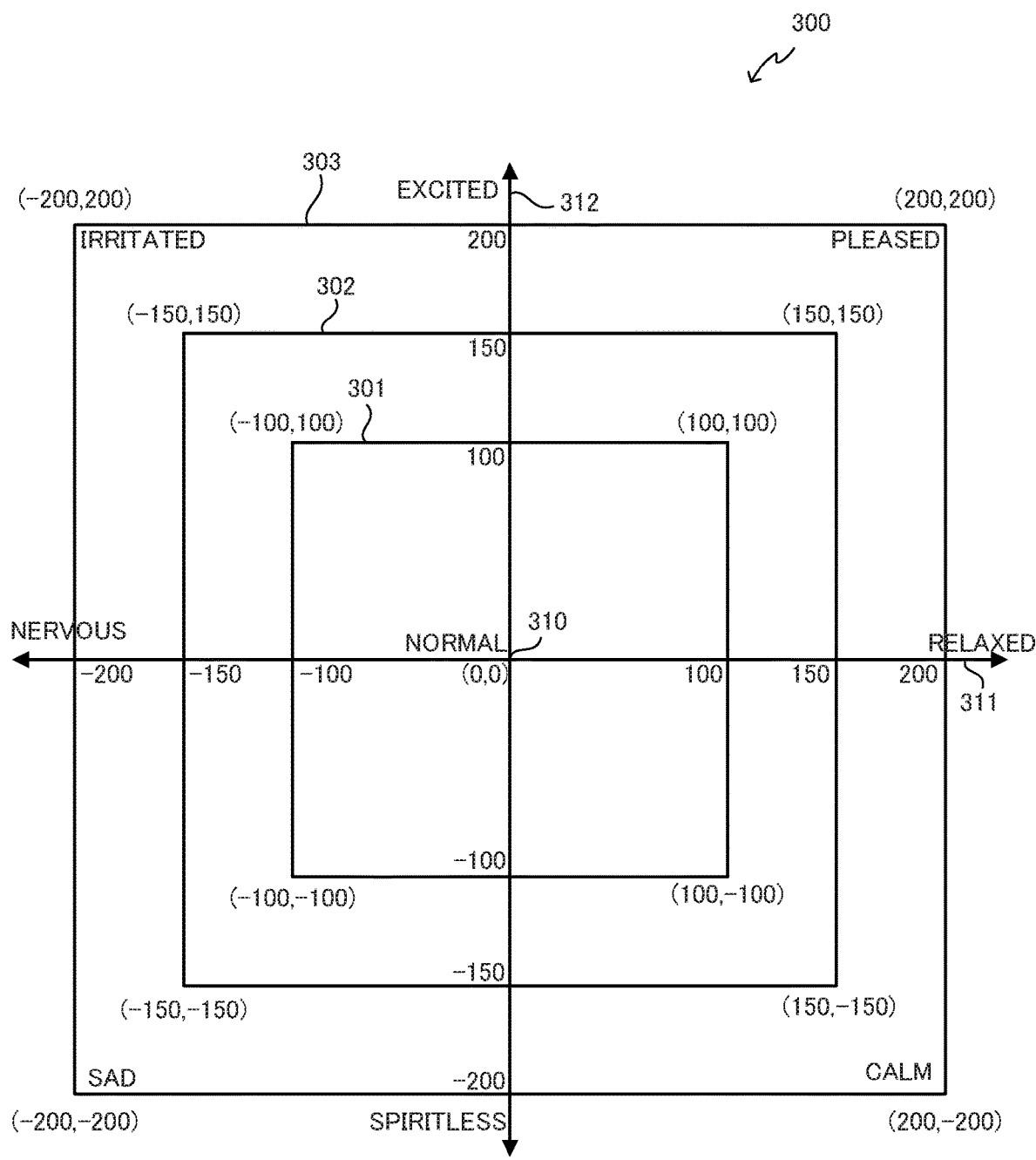
FIG. 9 is a diagram for describing an exemplary emotion map according to the embodiment.

The emotion data 121 provides the robot 200 with a simulated emotion. The emotion data 121 indicates coordinates (X, Y) on an emotion map 300. The emotion map 300 is depicted as a two-dimensional coordinate system having an X axis 311 indicating the degree of relaxation (degree of nervousness) and a Y axis 312 indicating the degree of excitement (degree of spiritlessness), as illustrated in FIG. 9. The emotion map 300 has an origin 310 (0, 0) indicating a normal emotion. As the absolute value of a positive X coordinate value (X value) increases, the robot 200 has an emotion at a higher degree of relaxation. As the absolute value of a positive Y coordinate value (Y value) increases, the robot 200 has an emotion at a higher degree of excitement. As the absolute value of a negative X value increases, the robot 200 has an emotion at a higher degree of nervousness. As the absolute value of a negative Y value increases, the robot 200 has an emotion at a higher degree of spiritlessness.

The emotion data 121 has two values: the X value (degree of relaxation and degree of nervousness) and the Y value (degree of excitement and degree of spiritlessness), which indicate a plurality of mutually different simulated emotions (four emotions in this embodiment). The point represented by the X and Y values on the emotion map 300 indicates the simulated emotion of the robot 200. The emotion data 121 has an initial value (0, 0). The emotion data 121 is parameters indicating the simulated emotion of the robot 200 and therefore also called emotion parameters. The emotion map 300 is depicted as a two-dimensional coordinate system in FIG. 9 but may have any dimension. For example, the emotion map 300 may have a single dimension, and the emotion data 121 may be defined by a single value. Alternatively, the emotion map 300 may have three or more dimensions using one or more additional axes, and the emotion data 121 may be defined by values, the number of which is equal to the number of dimensions of the emotion map 300.

According to the embodiment, the emotion map 300 has an initial size in which the X and Y values each have a maximum value of 100 and a minimum value of −100, as represented by a frame 301 in FIG. 9. Within a first duration, in response to every addition of a single day to the simulated days of growth of the robot 200, the maximum values in the emotion map 300 are each increased by two and the minimum values are each decreased by two. The first duration indicates a duration of simulated growth of the robot 200. The first duration is, for example, 50 days starting from the simulated birth of the robot 200. The simulated birth of the robot 200 indicates when a user activates the robot 200 for the first time since the shipment from the factory. At the days of growth of 25 days, the X and Y values each have a maximum value of 150 and a minimum value of −150, as represented by a frame 302 in FIG. 9. At the lapse of the first duration (50 days in this example), the X and Y values each have a maximum value of 200 and a minimum value of −200, as represented by a frame 303 in FIG. 9. The size of the emotion map 300 is fixed after the lapse of the first duration.

The settable range of the emotion data 121 is defined by the emotion map 300. That is, the settable range of the emotion data 121 expands with the size of the emotion map 300. Such expansion of the settable range of the emotion data 121 allows the robot 200 to express a greater variety of emotions. The expansion of the size of the emotion map 300 thus represents the simulated growth of the robot 200. The size of the emotion map 300 is fixed after the lapse of the first duration, which means completion of the simulated growth of the robot 200.

The emotional expression table 122 contains behavior control data and sound data. The behavior control data and the sound data are used to set a behavior and a sound associated with each emotion represented by the coordinates on the emotion map 300. The behavior control data and the sound data in the emotional expression table 122 are each represented by a two-dimensional array (behavior control data [X'][Y'] and sound data [X'][Y']). The X' and Y' values correspond to the respective coordinates (X, Y) on the emotion map 300. In detail, the values calculated by dividing the coordinates (X and Y values) on the emotion map 300 by a scale factor (for example, 100) and rounding the quotients off to the closest whole numbers are used as a two-dimensional array index (X' and Y' values) in the emotional expression table 122, according to the embodiment. In the case of a scale factor of 100, each of the X' and Y' values can be any of the five values: −2, −1, 0, 1, and 2. In this case, since each of the X' and Y' values has five candidates, 5×5=25 candidates of behavior control data and sound data are recorded in the emotional expression table 122. The apparatus control device 100 uses the index in the emotional expression table 122 corresponding to the coordinates indicated by the emotion data 121 of the robot 200 at the present time, so as to cause the robot 200 to express an emotion. In an exemplary case of the emotion data 121 (X, Y) of (60, −30), the index (X', Y') in the emotional expression table 122 is (1, 0) (X'=60÷100≈1, Y'=−10÷100≈0), so that behavior control data [1][0] and sound data[1][0] are used for emotional expression.

The index in the emotional expression table 122 may be associated with the coordinates in the emotion map 300 by any procedure other than the above-explained procedure. Although the area of the coordinates is equally divided into five for each of the X and Y axes in the above-explained procedure, this area is may be arbitrarily defined. For example, the area of 0 or higher in the X axis may be divided into ten, and the area of lower than 0 may be divided into two. The area between −30 to 30 in the Y axis may be divided into three, the area of lower than −30 may be divided into five, and the area of higher than 30 may be divided into six. Alternatively, the emotional expression table 122 may define the candidates (for example, 401×401=160,801 candidates) of behavior control data and sound data associated with the respective coordinates on the emotion map 300.

The days-of-growth data 123 has an initial value of 1 and is incremented by one every lapse of a single day. The days-of-growth data 123 indicates the number of simulated days of growth (days from the simulated birth) of the robot 200. The duration of the days of growth indicated by the days-of-growth data 123 will be referred to as "second duration".

The emotion change data 124 defines amounts of increase or decrease of the respective X and Y values of the emotion data 121. According to the embodiment, the emotion change data 124 includes a DXP for increasing the X value and a DXM for decreasing the X value, which are related to the X value of the emotion data 121. The emotion change data 124 also includes a DYP for increasing the Y value and a DYM for decreasing the Y value, which are related to the Y value of the emotion data 121. That is, the emotion change data 124 includes the four variables listed below. These variables are parameters for changing the simulated emotion of the robot 200 and therefore also called emotion change parameters.

DXP: tendency to get relaxed (variability of the X value to the positive direction in the emotion map)

DXM: tendency to get nervous (variability of the X value to the negative direction in the emotion map)

DYP: tendency to get excited (variability of the Y value to the positive direction in the emotion map)

DYM: tendency to get dispirited (variability of the Y value to the negative direction in the emotion map)

In an example illustrated in the embodiment, these variables have initial values of 10 and can be increased to the maximum value of 20 by the above-described amount-of-change learner 112. The amount-of-change learner 112 varies the emotion change data 124, that is, the degree of change in emotion, so that the robot 200 has various characters depending on how the user has treated the robot 200. In other words, the character of each robot 200 is uniquely established depending on the attitude of the user.

A robot controlling process executed by the control unit 110 of the apparatus control device 100 will now be explained with reference to the flowchart of FIG. 10. The robot controlling process indicates the process of the apparatus control device 100 for controlling the behavior and sound of the robot 200 on the basis of the detected values from the sensor unit 210 and the like. The robot controlling process is initiated when the user turns on the robot 200.

The control unit 110 first sets various types of data, such as the emotion data 121, the days-of-growth data 123, and the emotion change data 124 (Step S101). The control unit 110 sets initial values at the first activation of the robot 200 (when the user activates the robot 200 for the first time since the shipment from the factory), or sets the values that were stored in Step S107 (explained later) of the previous robot controlling process at the second and subsequent activations.

The external stimulation acquirer 111 then acquires an external stimulation from the sensor unit 210 (Step S102).

In accordance with the external stimulation acquired in Step S102, the amount-of-change acquirer 113 acquires the emotion change data 124 (emotion change parameters) for incrementing or decrementing the emotion data 121 (emotion parameters) (Step S103). As a specific example, if the touch sensor 211 of the head 204 detects that the user is tapping the head 204 of the robot 200 in the form of an external stimulation, the amount-of-change acquirer 113 acquires the DXP as the emotion change data 124 for incrementing the X value of the emotion data 121.

In accordance with the emotion change data 124 (emotion change parameters) acquired in Step S103, the setter 114 sets the emotion data 121 (emotion parameters) (Step S104). As a specific example, if the DXP is acquired as the emotion change data 124 in Step S103, the setter 114 adds the DXP of the emotion change data 124 to the X value of the emotion data 121. It should be noted that the value (X or Y value) of the emotion data 121 is set to the maximum value in the emotion map 300 in the case where the value of the emotion data 121 after addition of the emotion change data 124 is higher than the maximum value in the emotion map 300. Also, the value of the emotion data 121 is set to the minimum value in the emotion map 300 in the case where the value of the emotion data 121 after subtraction of the emotion change data 124 is lower than the minimum value in the emotion map 300.

In Steps S103 and S104, the types of the emotion change data 124 to be acquired and the procedure of setting the emotion data 121 may be arbitrarily defined for each external stimulation. The following explanation will be directed to an example. The maximum and minimum values of the X and Y values of the emotion data 121 are defined by the size of the emotion map 300. Accordingly, the maximum value in the emotion map 300 is set if the following calculation provides a value higher than the maximum value, while the minimum value in the emotion map 300 is set if the following calculation provides a value lower than the minimum value.

Being tapped on the head 204 (get relaxed): X=X+DXP

Being slapped on the head 204 (get nervous): X=X−DXM (These external stimulations are detectable at the touch sensor 211 of the head 204.)

Being tapped on the body 206 (get excited): Y=Y+DYP

Being slapped on the body 206 (get dispirited): Y=Y−DYM (These external stimulations are detectable at the touch sensor 211 of the body 206.)

Being held in the upright position (get pleased): X=X+DXP and Y=Y+DYP

Being suspended upside down in the air (get sad): X=X−DXM and Y=Y−DYM (These external stimulations are detectable at the touch sensors 211 and the acceleration sensor 212.)

Being called by a soft voice (get calm): X=X+DXP and Y=Y−DYM

Being scolded by a loud voice (get irritated): X=X−DXM and Y=Y+DYP (These external stimulations are detectable at the microphone 213.)

For example, when being tapped on the head 204, the robot 200 has a simulated emotion of getting relaxed. That is, the DXP of the emotion change data 124 is added to the X value of the emotion data 121. In contrast, when being slapped on the head 204, the robot 200 has a simulated emotion of getting nervous. That is, the DXM of the emotion change data 124 is subtracted from the X value of the emotion data 121. Since the external stimulation acquirer 111 acquires mutually different types of external stimulations from the sensors included in the sensor unit 210 in Step S102, each piece of the emotion change data 124 is acquired in accordance with each of the external stimulations, followed by setting of the emotion data 121 in accordance with the acquired piece of the emotion change data 124.

In accordance with the emotion data 121 (emotion parameters) set as explained above, the behavior controller 115 controls the behavior of the robot 200 (Step S105). Specifically, the behavior controller 115 drives the drive unit 220 and causes the output unit 230 to emit a sound, on the basis of the values (behavior control data and sound data) in the emotional expression table 122 associated with the coordinates on the emotion map 300 indicated by the emotion data 121.

The control unit 110 then determines whether to terminate the process (Step S106). For example, the process is terminated if the operation unit 240 receives an instruction to turn off the robot 200. If determining to terminate the process (Step S106; Yes), the control unit 110 stores the various types of data (for example, the emotion data 121, the days-of-growth data 123, and the emotion change data 124) into the non-volatile memory (for example, flash memory) of the storage unit 120 (Step S107), and then terminates the robot controlling process.

If determining not to terminate the process (Step S106; No), the control unit 110 determines whether the date has changed using the clocking function (Step S108). If the date has not changed (Step S108; No), the process returns to Step S102.

If the date has changed (Step S108; Yes), the control unit 110 determines whether the present time is within the first duration (Step S109). In an exemplary case where the first duration is 50 days starting from the simulated birth of the robot 200 (from when the user activates the robot 200 for the first time since the shipment from the factory), the control unit 110 determines that the present time is within the first duration if the days-of-growth data 123 indicates 50 or smaller. If the present time is not within the first duration (Step S109; No), the process returns to Step S102.

If the present time is within the first duration (Step S109; Yes), the amount-of-change learner 112 learns the emotion change data 124 (emotion change parameters) (Step S110). Specifically, the amount-of-change learner 112 updates the emotion change data 124 as explained below and learns the updated emotion change data 124. If the X value of the emotion data 121 has been set to the maximum value in the emotion map 300 in Step S104 even just once on the present day, the DXP of the emotion change data 124 is incremented by one. If the Y value of the emotion data 121 has been set to the maximum value in the emotion map 300 even just once, the DYP of the emotion change data 124 is incremented by one. If the X value of the emotion data 121 has been set to the minimum value in the emotion map 300 even just once, the DXM of the emotion change data 124 is incremented by one. If the Y value of the emotion data 121 has been set to the minimum value in the emotion map 300 even just once, the DYM of the emotion change data 124 is incremented by one. It should be noted that each value of the emotion change data 124 has an upper limit of 20, for example, because an excessively large value of the emotion change data 124 would result in an excessively large amount of each change in the emotion data 121. Each value of the emotion change data 124 is incremented by one in this example, but may also be incremented by two or more if the counted number of times of setting to the maximum or minimum value exceeds a threshold number, for example.

In Step S110 of learning the emotion change data 124 (emotion change parameters), whether the emotion data 121 is set to the maximum or minimum value in the emotion map 300 in Step S104 is determined depending on the external stimulation acquired in Step S102. Since mutually different types of external stimulations are acquired from the sensors included in the sensor unit 210 in Step S102, each piece of the emotion change data 124 is learned in response to each of the external stimulations. For example, repetitive tapping on only the head 204 leads to an increase in only the DXP of the emotion change data 124 and no change in the other values of the emotion change data 124, thereby making the robot 200 a character of readily getting relaxed. In contrast, repetitive slapping on only the head 204 leads to an increase in only the DXM of the emotion change data 124 and no change in the other values of the emotion change data 124, thereby making the robot 200 a character of readily getting nervous. The amount-of-change learner 112 thus learns the values of the emotion change data 124 independently and differently from each other depending on each of the external stimulations.

The control unit 110 then expands the emotion map 300 by increasing the maximum values by two and decreasing the minimum values by two (Step S111), increments the days-of-growth data 123 by one, and returns to Step S102. Although the maximum and minimum values in the emotion map 300 are shifted by two in this example, this amount of shift is a mere example. The amount of shift may be one or three or more other than two. The amounts of shift may be different between the individual axes of the emotion map 300 and between the maximum and minimum values.

Figure 10:
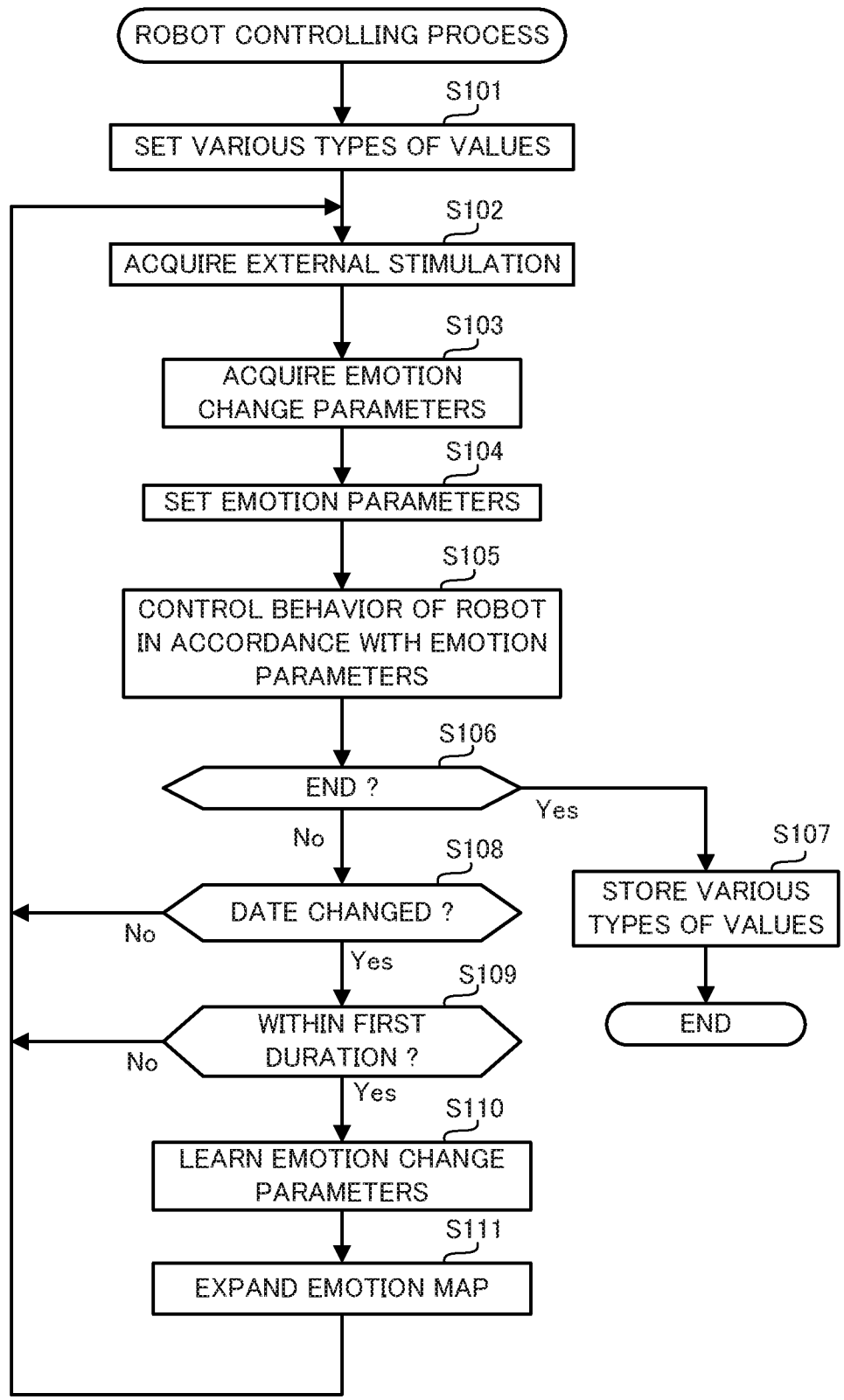
FIG. 10 is a flowchart illustrating a robot controlling process according to the embodiment.

Although the learning of the emotion change parameters and the expansion of the emotion map are executed after determination of date change in Step S108 in FIG. 10, these steps may also be executed after determination of arrival at a reference time (for example, 21 o'clock). Alternatively, the determination in Step S108 may be based on the accumulated power-on time of the robot 200 counted using the timer function of the control unit 110, instead of based on the actual date. For example, the robot 200 may be deemed to get growth of a single day every time when the accumulated power-on time reaches a multiple of 24, accompanied with the learning of the emotion change parameters and the expansion of the emotion map.

The above-explained robot controlling process allows the robot 200 to have a simulated emotion (emotion data 121) and a character (emotion change data 124). Each robot 200 uniquely shows a change in emotion in response to an external stimulation because of the learning of the emotion change data 124 for changing the emotion data 121 in accordance with the external stimulation. The robot 200 can thus have a unique simulated character. Such a simulated emotion and character can be achieved by the simple data structure and algorithm as described above, resulting in a simple software configuration.

The simulated emotion is indicated by a plurality of emotion parameters (X and Y values of the emotion data 121), while the simulated character is indicated by a plurality of emotion change parameters (DXP, DXM, DYP, and DYM of the emotion change data 124). The robot 200 can therefore represent complicated emotions and characters.

The emotion change data 124 for achieving the simulated character is learned independently and differently from each other in accordance with each of the mutually different types of external stimulations acquired from the sensors included in the sensor unit 210. The robot 200 can therefore have a great variety of simulated characters depending on how the user has treated the robot 200.

The period of learning of the emotion change data 124 is limited within the first duration (for example, 50 days from the simulated birth), and the emotion change data 124 (character) is fixed after the lapse of the first duration. The robot 200 therefore cannot be reset, unlike other ordinary apparatuses, and makes the user feel as if the robot 200 is a real living pet.

Because of the emotion map expanded depending on the days of growth, the range of emotional expression of the robot 200 is extended day by day. The user can therefore be pleased to see the robot 200 is growing.

(Modification)

The above-described embodiment should not be construed as limiting the disclosure and may receive various modifications and applications. For example, the above-described emotional expression table 122 defines a movement of the head 204 and a sound of the robot 200 associated with each emotion indicated by the coordinates on the emotion map, but may define only one of the movement of the head 204 and the sound. Alternatively, the robot 200 may execute another control of an operation other than the movement of the head 204 and sound. An exemplary control of an operation other than the movement of the head 204 and sound includes the control of the color and brightness of the LED for emitting light included in the output unit 230 of the robot 200.

According to the above-described embodiment, the size of the emotion map is expanded such that the maximum and minimum values in the emotion map are each incremented by two in response to every addition of a single day to the days of simulated growth of the robot 200 within the first duration. The emotion map, however, should not necessarily be equally expanded as explained above. For example, the procedure of expanding the emotion map may be varied depending on the manner of change in the emotion data 121.

In order to vary the procedure of expanding the emotion map depending on the manner of change in the emotion data 121, Step S111 of the robot controlling process (FIG. 10) may involve the following process, for example. If a value of the emotion data 121 has been set to the maximum value in the emotion map in Step S104 even just once on the present day, the maximum value in the emotion map is incremented by three in the following Step S111. In contrast, if a value of the emotion data 121 has not been set to the maximum value in the emotion map in Step S104 even just once, the maximum value in the emotion map is incremented by one in the following Step S111.

The same holds true for the minimum values in the emotion map. In detail, if a value of the emotion data 121 has been set to the minimum value in the emotion map even just once on the present day, the minimum value in the emotion map is decremented by three. In contrast, if a value of the emotion data 121 has not been set to the minimum value in the emotion map even just once, the minimum value in the emotion map is decremented by one. Because of this procedure of expanding the emotion map, the settable range of the emotion data 121 is learned in accordance with the external stimulation. That is, in Step S111, the control unit 110 learns the settable range of the emotion data 121 (emotion parameters) in accordance with the external stimulation acquired within the second duration (duration indicated by the days-of-growth data 123).

In an exemplary case of the first duration of 50 days, the emotion map expanded as explained above can have maximum values of 250 and minimum values of −250. The behavior control data and the sound data recorded in the emotional expression table 122 are therefore required to cover the maximum values of 250 and the minimum values of −250. Although the emotion map is expanded all the time in the first duration according to the above-described embodiment and modification, the emotion map should not necessarily be expanded. For example, the emotion map may be contracted with respect to the direction of emotion that has hardly occurred in response to external stimulations.

Because of this procedure of expanding the emotion map variable depending on external stimulations, not only the emotion change parameters (emotion change data 124) but also the emotion map are reflected in the simulated character of the robot 200. The robot 200 can therefore represent a greater variety of characters depending on how the user has treated the robot 200.

Figure 11:
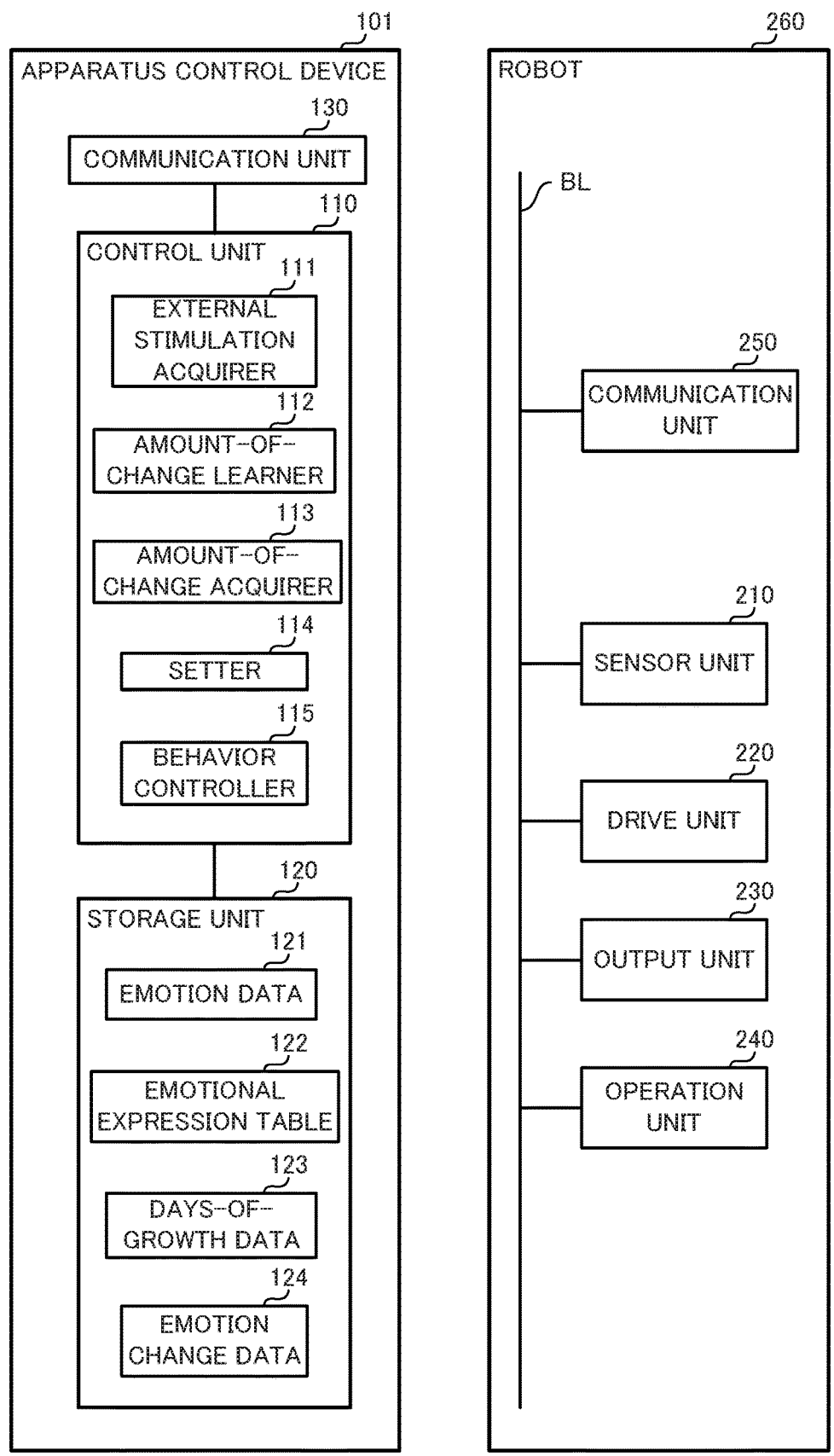
FIG. 11 is a block diagram illustrating functional configurations of an apparatus control device and a robot according to a modification.

According to the above-described embodiment, the apparatus control device 100 is installed in the robot 200. Alternatively, with reference to FIG. 11, an apparatus control device 101 may be an independent device (for example, server) outside a robot 260. According to this modification, the apparatus control device 101 includes a communication unit 130, and the robot 260 also includes a communication unit 250, such that the communication unit 130 and the communication unit 250 can transmit or receive data to or from each other. The external stimulation acquirer 111 acquires external stimulations detected by the sensor unit 210 via the communication unit 130 and the communication unit 250. The behavior controller 115 controls the drive unit 220 and the output unit 230 via the communication unit 130 and the communication unit 250.

The apparatus control device 100 or 101 controls the robot 200 or 260 according to the above-described embodiment, but may control an apparatus other than the robot 200 or 260. Examples of apparatus to be controlled include a watch. In an exemplary case where the apparatus to be controlled is a watch capable of outputting voices and equipped with an acceleration sensor, one of the conceivable external stimulations may be a shock applied to the watch and detected by the acceleration sensor. The apparatus control device 100 or 101 may update the emotion change data 124 and the emotion data 121 in accordance with this external stimulation, and output audio data defined in the emotional expression table 122 on the basis of the emotion data 121 at the time when the user wears the watch.

The watch can thus be configured to emit a sad voice at the time of wearing on the user if the user has roughly handled the watch, and emit a pleased voice at the time of wearing on the user if the user has gently handled the watch. In the case where the emotion change data 124 is set within the first duration (for example, 50 days), the watch can have different identities (simulated characters) depending on how the user has handled the watch in the first duration. In other words, some watches readily get pleased due to the gentle attitude of the user while other watches readily get sad due to the rough attitude of the user, even if these watches have the same model number.

As described above, the apparatus control device 100 or 101 can be applied to various apparatuses other than robots. The apparatus control device 100 or 101 applied to an apparatus can provide the apparatus with a simulated emotion and character, and cause the user to feel as if the user helps the apparatus to grow up.

According to the above-described embodiment, the operational programs executed by the CPU of the control unit 110 are stored in the ROM and the like of the storage unit 120 in advance. This configuration, however, should not be construed as limiting the disclosure. The operational programs for execution of the above-explained various processes may also be installed in an existing general purpose computer or the like, so that the device corresponds to the apparatus control device 100 or 101 according to the above-described embodiment.

These programs may be provided by any procedure. For example, the programs may be stored for distribution in a non-transitory computer-readable recording medium, such as a flexible disk, a compact disc read-only memory (CD-ROM), a digital versatile disc read-only memory (DVD-ROM), a magneto-optical (MO) disc, a memory card, or a USB memory. Alternatively, the programs may be stored in a storage on a network, such as the Internet, and may be downloaded into a computer.

If the above-explained processes are shared by an operating system (OS) and an application program or achieved by cooperation between the OS and the application program, only the application program may be stored in a non-transitory recording medium or a storage. Alternatively, the program may be superimposed on a carrier wave and distributed via a network. For example, the program may be posted on a bulletin board system (BBS) on a network and thus delivered via the network. In this case, the program may be configured to be able to execute the above-explained processes when activated and executed under the control of the OS as well as other application programs.

The foregoing describes some example embodiments for explanatory purposes. Although the foregoing discussion has presented specific embodiments, persons skilled in the art will recognize that changes may be made in form and detail without departing from the broader spirit and scope of the invention. Accordingly, the specification and drawings are to be regarded in an illustrative rather than a restrictive sense. This detailed description, therefore, is not to be taken in a limiting sense, and the scope of the invention is defined only by the included claims, along with the full range of equivalents to which such claims are entitled.

What is claimed is:

1. An apparatus control device for controlling an apparatus, the device comprising:
   at least one processor; and
   a memory configured to store a program to be executed by the processor, wherein
   the processor is configured to
      acquire at least one external stimulation applied from an outside to the apparatus,
      learn at least one emotion change parameter for changing a simulated emotion of the apparatus in accordance with the acquired external stimulation,
      acquire the learned emotion change parameter in accordance with the acquired external stimulation,
      set at least one emotion parameter indicating the simulated emotion of the apparatus in accordance with the acquired emotion change parameter, and
      control a behavior of the apparatus in accordance with the set emotion parameter.

2. The apparatus control device according to claim 1, wherein
   the at least one emotion parameter comprises a plurality of emotion parameters indicating mutually different simulated emotions, and
   the at least one emotion change parameter comprises a plurality of emotion change parameters corresponding to the emotion parameters.

3. The apparatus control device according to claim 2, wherein
   the processor is configured to
      acquire a plurality of external stimulations of mutually different types as the at least one external stimulation, and learn the emotion change parameters independently and differently from each other in accordance with each of the external stimulations.

4. The apparatus control device according to claim 1, wherein the processor is configured to learn the emotion change parameter in accordance with the external stimulation acquired within a first duration.

5. The apparatus control device according to claim 1, wherein the processor is configured to learn a settable range of the emotion parameter in accordance with the external stimulation acquired within a second duration.

6. A method of controlling an apparatus executed by an apparatus control device, the method comprising:
    acquiring at least one external stimulation applied from an outside to the apparatus;
    learning at least one emotion change parameter for changing a simulated emotion of the apparatus in accordance with the acquired external stimulation;
    acquiring the learned emotion change parameter in accordance with the acquired external stimulation;
    setting at least one emotion parameter indicating the simulated emotion of the apparatus in accordance with the acquired emotion change parameter; and
    controlling a behavior of the apparatus in accordance with the set emotion parameter.

7. A non-transitory recording medium storing a program thereon, the program causing a computer to:
    acquire at least one external stimulation applied from an outside to an apparatus;
    learn at least one emotion change parameter for changing a simulated emotion of the apparatus in accordance with the acquired external stimulation;
    acquire the learned emotion change parameter in accordance with the acquired external stimulation;
    set at least one emotion parameter indicating the simulated emotion of the apparatus in accordance with the acquired emotion change parameter; and
    control a behavior of the apparatus in accordance with the set emotion parameter.

* * * * *